US009094436B2

(12) United States Patent
Westra et al.

(10) Patent No.: US 9,094,436 B2
(45) Date of Patent: Jul. 28, 2015

(54) METHODS AND SYSTEMS FOR INTERFACING WITH A VEHICLE COMPUTING SYSTEM OVER MULTIPLE DATA TRANSPORT CHANNELS

(75) Inventors: Michael Raymond Westra, Plymouth, MI (US); Michael J. Schanerberger, Northville, MI (US); Sukhwinder Wadhwa, Windsor (CA); Sandeep Singh Waraich, Tecumseh (CA); Julius Marchwicki, Detroit, MI (US); Tahrik Alcodray, Dearborn, MI (US); Jeffrey Raymond Ostrowski, Dearborn, MI (US); Doron M. Elliott, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1275 days.

(21) Appl. No.: 12/788,811

(22) Filed: May 27, 2010

(65) Prior Publication Data

US 2011/0296037 A1 Dec. 1, 2011

(51) Int. Cl.

| | |
|---|---|
| ***G06F 15/16*** | (2006.01) |
| ***H04L 29/08*** | (2006.01) |
| ***H04L 29/06*** | (2006.01) |
| *H04L 12/28* | (2006.01) |

(52) U.S. Cl.

CPC .............. *H04L 67/141* (2013.01); *H04L 67/12* (2013.01); *H04L 69/18* (2013.01); *H04L 12/282* (2013.01); *H04L 2012/2841* (2013.01)

(58) Field of Classification Search

CPC ........ H04L 67/12; H04L 67/141; H04L 69/18

USPC .......... 709/201–230, 238, 231; 719/330–336; 370/210–226, 338, 469

See application file for complete search history.

(56) References Cited

U.S. PATENT DOCUMENTS

| | | | |
|---|---|---|---|
| 6,526,335 | B1 | 2/2003 | Treyz et al. |
| 7,207,041 | B2 | 4/2007 | Elson et al. |
| 7,266,435 | B2 | 9/2007 | Wang et al. |
| 7,505,784 | B2 | 3/2009 | Barbera |
| 7,602,782 | B2 | 10/2009 | Doviak et al. |
| 7,801,941 | B2 | 9/2010 | Conneely et al. |

(Continued)

OTHER PUBLICATIONS

Narasimhan, et al., A lightweight remote display management protocol for mobile devices, Application Research Center, Motorola Labs Schaumburg, IL, 2007, pp. 711-715.

(Continued)

*Primary Examiner* — Jungwon Chang

(74) *Attorney, Agent, or Firm* — Jennifer M. Stec; Brooks Kushman P.C.

(57) ABSTRACT

In one or more embodiments, two or more devices may interface with a computing system over multiple communication channels. A connection may be established between a computing system and two or more devices communicating data using different communication protocols. The communication protocol of the two or more devices may be determined and a general transport protocol for communicating data with the two or more devices based on the respective communication protocols may be imposed on the communication protocol of the two or more devices. Data may be communicated with the two or more devices based on the general transport protocol. An event may be performed at the vehicle computing system or the two or more devices based on the data.

7 Claims, 5 Drawing Sheets

(56) References Cited

U.S. PATENT DOCUMENTS

| | | | | |
|---|---|---|---|---|
| 2002/0098853 | A1 | 7/2002 | Chrumka | |
| 2002/0103715 | A1* | 8/2002 | Bennett et al. | 705/26 |
| 2002/0107010 | A1* | 8/2002 | Witte et al. | 455/418 |
| 2003/0079123 | A1 | 4/2003 | Mas Ribes | |
| 2003/0139179 | A1* | 7/2003 | Fuchs et al. | 455/426 |
| 2003/0147534 | A1 | 8/2003 | Ablay et al. | |
| 2004/0203660 | A1 | 10/2004 | Tibrewal et al. | |
| 2004/0205216 | A1* | 10/2004 | Ballinger et al. | 709/231 |
| 2004/0260438 | A1 | 12/2004 | Chernetsky et al. | |
| 2004/0267585 | A1 | 12/2004 | Anderson et al. | |
| 2005/0091408 | A1 | 4/2005 | Parupudi et al. | |
| 2005/0177635 | A1 | 8/2005 | Schmidt et al. | |
| 2006/0150197 | A1 | 7/2006 | Werner | |
| 2006/0156315 | A1 | 7/2006 | Wood et al. | |
| 2006/0190097 | A1 | 8/2006 | Rubenstein | |
| 2006/0287787 | A1 | 12/2006 | Engstrom et al. | |
| 2006/0287821 | A1 | 12/2006 | Lin | |
| 2007/0016362 | A1 | 1/2007 | Nelson | |
| 2007/0042809 | A1 | 2/2007 | Angelhag | |
| 2007/0042812 | A1 | 2/2007 | Basir | |
| 2007/0050854 | A1 | 3/2007 | Cooperstein et al. | |
| 2007/0132572 | A1 | 6/2007 | Itoh et al. | |
| 2007/0140187 | A1* | 6/2007 | Rokusek et al. | 370/338 |
| 2007/0294625 | A1 | 12/2007 | Rasin et al. | |
| 2008/0148374 | A1 | 6/2008 | Spaur et al. | |
| 2008/0220718 | A1 | 9/2008 | Sakamoto et al. | |
| 2008/0313050 | A1 | 12/2008 | Basir | |
| 2009/0075624 | A1 | 3/2009 | Cox et al. | |
| 2009/0106036 | A1 | 4/2009 | Tamura et al. | |
| 2009/0117890 | A1 | 5/2009 | Jacobsen et al. | |
| 2009/0228908 | A1 | 9/2009 | Margis et al. | |
| 2009/0253466 | A1 | 10/2009 | Saito et al. | |
| 2009/0318119 | A1 | 12/2009 | Basir et al. | |
| 2010/0063670 | A1 | 3/2010 | Brzezinski et al. | |
| 2010/0094996 | A1 | 4/2010 | Samaha | |
| 2010/0098853 | A1 | 4/2010 | Hoffmann et al. | |
| 2010/0131642 | A1* | 5/2010 | Chalikouras et al. | 709/224 |
| 2010/0216509 | A1 | 8/2010 | Riemer et al. | |
| 2010/0234071 | A1* | 9/2010 | Shabtay et al. | 455/562.1 |
| 2010/0306309 | A1 | 12/2010 | Santori et al. | |
| 2011/0105097 | A1 | 5/2011 | Tadayon et al. | |
| 2011/0112762 | A1 | 5/2011 | Gruijters et al. | |
| 2011/0195659 | A1 | 8/2011 | Boll et al. | |
| 2011/0238861 | A1* | 9/2011 | Hutchinson | 709/238 |

OTHER PUBLICATIONS

Voelcker, Top 10 Tech Cars It's the Environment, Stupid, www.spectrum.ieee.org, Apr. 2008, pp. 26-35.

Yarden, et al., TUKI: A Voice-Activated Information Browser, IEEE, 2009, pp. 1-5.

Gil-Castineira, et al., Integration of Nomadic Devices with Automotive User Interfaces, IEEE Transactions on Consumer Electronics, vol. 55, No. 1, Feb. 2009.

Nusser, et al., Bluetooth-based Wireless Connectivity in an Automotive Environment, Robert Bosch GmbH, VTC 2000, pp. 1935-1942.

Antuan Goodwin, The Car Tech Blog, Ford Unveils open-source Sync developer platform, http://reviews.cnet.com/8301-13746_7-10385619-48.html, Oct. 2009, pp. 1-5.

Service Discovery Protocol (SDP) Layer Tutorial, Palowireless Bluetooth Research Center, http://www.palowireless.com/infotooth/tutorial/sdp.asp. Aug. 3, 2010.

IPhone Hacks, Apple Files Patent Which Allow You to Control Your Computer Remotely Using IPhone, http://www.iphonehacks.com/2009/12/apple-files-patent-which-could-allow-you-to-control-your-computer-remotely-using-iphone, Jun. 22, 2010.

Zack Newmark, American, Concept Car, Ford, Gadgets, Lifestyle, Technology, Student develop in-car cloud computing apps; envision the future of in-car connectivity, May 4, 2010, http://ww.woldcarfans.com/print/110050425986/student-develop-in-car-cloud-computing_apps;_envision_the_future_of_in-car_connectivity.

Darryl Chantry, MSDN, Mapping Applications to the Cloud, 2010 Microsoft Corporation, Platform Architecture Team, Jan. 2009, http://msdn.microsoft.com/en-us/library/dd430340(printer).aspx, Jun. 18, 2010.

Wikipedia, the free encyclopedia, X Window System, http://en.wikipedia.org/wiki/X_Window_System, Jun. 22, 2010.

"MobileSafer is your personal safe driving assistant", 2010 ZoomSafer Inc. <http://zoomsafer.com/products/mobilesafer> Dec. 28, 2010.

"How PhonEnforcer Works" Turn Off the Cellphone While Driving—PhonEnforcer. Turn Off the Cell Phone LLC. <http://turnoffthecellphone.com/howitworks.htm> Dec. 28, 2010, pp. 1-3.

"PhonEnforcer FAQ's" Turn Off the Cellphone While Driving—PhonEnforcer. Turn Off the Cell Phone Llc. <http://turnoffthecellphone.com/faq.html> Dec. 28, 2010, pp. 1-2.

Lamberti, Ralph "Daimler Full Circle: The Rise of Vehicle-Installed Telematics—Telematics Munich 2009" Nov. 10, 2009.

Ford Motor Company, "Navigation System: SYNC," Owner's Guide Supplement, SYNC Version 1 (Jul. 2007).

Ford Motor Company, "SYNC," Owner's Guide Supplement, SYNC Version 1 (Nov. 2007).

Ford Motor Company, "Navigation System: SYNC," Owner's Guide Supplement, SYNC Version 2 (Oct. 2008).

Ford Motor Company, "SYNC," Owner's Guide Supplement, SYNC Version 2 (Oct. 2008).

Ford Motor Company, "Navigation System: SYNC," Owner's Guide Supplement, SYNC Version 3 (Jul. 2009).

Ford Motor Company, "SYNC," Owner's Guide Supplement, SYNC Version 3 (Aug. 2009).

Kermit Whitfield, "A hitchhiker's guide to the telematics ecosystem", Automotive Design & Production, Oct. 2003, http://findarticles.com, pp. 1-3.

K. Whitfield, A hitchhiker's guide to the telematics ecosystem, Automotive Design & Production, Oct. 2003.

* cited by examiner

METHODS AND SYSTEMS FOR INTERFACING WITH A VEHICLE COMPUTING SYSTEM OVER MULTIPLE DATA TRANSPORT CHANNELS

BACKGROUND

1. Technical Field

One or more embodiments relate to an interface for communicating data between a number of devices and a vehicle computing system. The number of devices may communicate data over different communication protocols. In some embodiments, the number of devices may be wired or wireless devices.

2. Background Art

Various examples of tools exist in the art for facilitating communication between multiple terminals over a communication network.

U.S. Pat. No. 7,602,782 issued to Doviak et al. discloses an apparatus and method for intelligent routing of data between a remote device and a host system. More specifically, Doviak et al. provides for transparent communication between a remote or mobile device and a fixed communication host network. A remote network controller that logically resides between the host network and the existing infrastructure(s) are used to provide communications network contact with one or more remote devices. The remote network controller is connected to the host communication network as a protocol-appropriate communications controller so that remote devices are indistinguishable to the host network from the locally-attached devices. Each remote device may be provided with an asynchronous serial data interface to communicate with a mobile data controller. The mobile data controller, in combination with the remote network controller, provides end-to-end data communication such that incompatible protocols are transparent to the remote device and host communication network. A router may be provided which selects a communications network in accordance with user configured parameters. The router communicates over a plurality of incompatible networks and is capable of using a variety of different protocols. Switching between the plurality of incompatible networks is transparent to the remote device and host communication network.

U.S. Patent Application Publication No. 2006/0150197 to Werner discloses a connection of clients for management of system. Werner discloses generating an instance of a program object for a client system, the client system being of a computer platform type, the program object being compatible with a plurality of different computer platform types. Werner further discloses connecting the instance of the program object with an interface of a server and managing an application on the server using the instance of the program object.

U.S. Patent Application Publication No. 2006/0156315 to Wood et al. discloses a method, computer-readable medium and apparatus for providing a graphical user interface in a client-server environment. Wood et al. specifically discloses a client program in a client/server relationship that receives commands creating a specific implementation of graphical user interface components and receives any data to be displayed in the interface components from the server program. As the end user interacts with the client, the client returns events and data to the server for processing. The commands and events constitute a protocol, published via an API. The transmission of commands events between the client and server is accomplished without linking the programs. The specific GUI implementation is specified by the server application and revealed to the client only at run time.

SUMMARY

One aspect includes a method for interfacing two or more devices and a vehicle computing system. A request to connect with a vehicle computing system may be received from the two or more devices which communicate data using different communication protocols. The communication protocols may include, but are not limited to, Internet protocols, BLUETOOTH protocols, proprietary protocols, 802.11 protocols, and mass storage device protocols.

The connection, which may or may not be a simultaneous connection, may be established with the two or more devices based on the connection request. The method may further include determining the communication protocol of the two or more devices. A general transport protocol may be imposed on the communication protocol of the two or more devices for communicating data with the two or more devices based on the respective communication protocols. A data exchange may accomplished with the two or more devices based on the general transport protocol. The data may include, but is not limited to, instructions to operate one or more application programs installed on the two or more devices or instructions for performing the event based on one or more service types. Service types may include, but are not limited to, a remote procedure call, bulk transport, or media streaming.

The method may further include performing an event at the vehicle computing system or the two or more devices based on the data.

In one embodiment, the general transport protocol may be transport agnostic.

Another aspect may include a system comprising a data processor which may be configured to connect with two or more devices. The two or more devices may communicate using different communication protocols. The data processor may be further configured to determine the protocol(s) of the two or more devices. A general protocol for communicating data with the two or more devices may be imposed based on their respective communication protocols. Data may be communicated with the device(s) for performing an event.

In one non-limiting embodiment, the data processor may be a vehicle computer.

In some embodiments, the two or more devices may be configured to listen for a connection request from the data processor. Further, the two or more devices may be simultaneously connected with the data processor.

Another aspect includes a computer program product embodied in a computer readable medium for interfacing two or more devices and a vehicle computing system. The computer program product may include instructions for establishing a connection (which may or may not be a simultaneous connection) with two or more devices which communicate data using different communication protocols. The communication protocol of the two or more devices may be determined and a general transport protocol for communicating data with the two or more devices based on the respective communication protocols may be imposed on the communication protocol of the two or more devices.

The computer program product may further include instructions for communicating the data based on the general transport protocol for performing an event based on the data. An event may include, but is not limited to, playing media files, performing vehicle diagnostics, audibly outputting one or more messages, confirming an existence of an application session, and performing location based services.

In one embodiment, the computer program product may include instructions for receiving from the two or more devices a request to connect with the vehicle computing system.

In some embodiments, the data may include instructions for performing the event based on one or more service types which have a predefined priority. The computer program product may further instructions for transporting the event instructions based on the service type priority. A service type may include, but is not limited to, a remote procedure call, bulk transport service, or a heartbeat.

These and other aspects will be better understood in view of the attached drawings and following detailed description of the invention.

BRIEF DESCRIPTION OF THE DRAWINGS

The figures identified below are illustrative of some embodiments of the invention. The figures are not intended to be limiting of the invention recited in the appended claims. The embodiments, both as to their organization and manner of operation, together with further object and advantages thereof, may best be understood with reference to the following description, taken in connection with the accompanying drawings, in which:

DETAILED DESCRIPTION

Detailed embodiments of the invention are disclosed herein. However, it is to be understood that the disclosed embodiments are merely exemplary of an invention that may be embodied in various and alternative forms. Therefore, specific functional details disclosed herein are not to be interpreted as limiting, but merely as a representative basis for the claims and/or as a representative basis for teaching one skilled in the art to variously employ the present invention.

Devices such as personal computers, handheld diagnostic tools, cellular phones, smartphones, personal digital assistants (PDA), and the like may each include different communication channels for communicating data. Non-limiting examples include cellular, BLUETOOTH, WiFi, WiMax, infrared (IF), RF, and the like. Some devices, such as the iPhone manufactured by THE APPLE CORPORATION, may communicate data using proprietary protocols.

Furthermore, these devices may have installed on them applications or programs (hereinafter referred to as "applications") for use by a user of the device. These applications may serve a variety of purposes for the user such as correspondence, entertainment, diagnostics, and social networking. A user usually operates these applications locally on the nomadic device. These applications, accordingly, may be programmed with instructions for receiving inputs and operation commands from the local nomadic device in order to operate the application(s).

In some instances, however, a user can operate these applications remotely. As one example, a user may operate these applications from a vehicle infotainment system. One example of such a vehicle infotainment system is SYNC from THE FORD MOTOR COMPANY. In such scenarios, the application(s) may be installed on the nomadic device, but the operation of the application(s) is performed through the vehicle computing system. However, the application(s) generally are not programmed to operate through the remote terminal such as the vehicle computing system. Thus, a user may not be able to obtain functionality of these applications without an ability to interface with the functionality and controls of the remote terminal.

Figure 1:
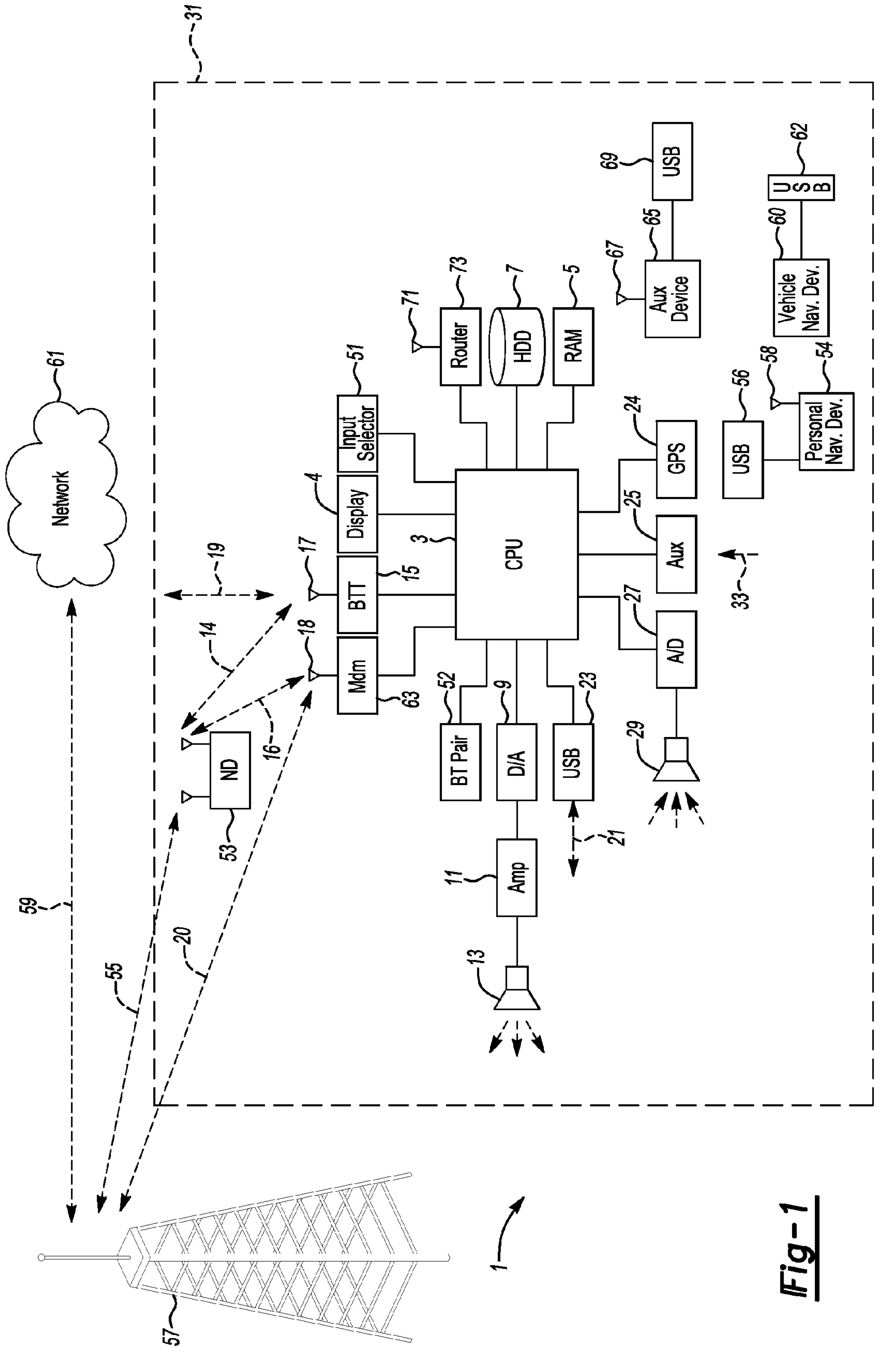
FIG. 1 is a block topology for a vehicle computing system.

FIG. 1 illustrates an example block topology for a vehicle based computing system (VCS) 1 for a vehicle 31. It will be appreciated that the arrangement of FIG. 1 (and FIGS. 2-7 below) is non-limiting. Thus, the disclosure and arrangement of FIG. 1-7 may be modified or re-arranged to best fit a particular implementation of the various embodiments of the invention.

A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor.

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, etc.). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH Trasceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device).

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example).

If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (e.g., and without limitation, modem 63) that is installed to vehicle 31. In yet another embodiment, the ND 53 may be a wireless local area network (LAN) device capable of communication over, for example (and without limitation), an 802.11 network (including, but not limited to, WiFi and WiMax) and Long Term Evolution (LTE) networks.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58; or a vehicle navigation device 60, having a USB 62 or other connection, an onboard GPS device 24, or remote navigation system (not shown) having connectivity to network 61.

Further, the CPU could be in communication with a variety of other auxiliary devices 65. These devices can be connected through a wireless 67 or wired 69 connection. Also, or alternatively, the CPU could be connected to a vehicle based wireless router 73, using for example a WiFi 71 transceiver. This could allow the CPU to connect to remote networks in range of the local router 73.

Figure 2:
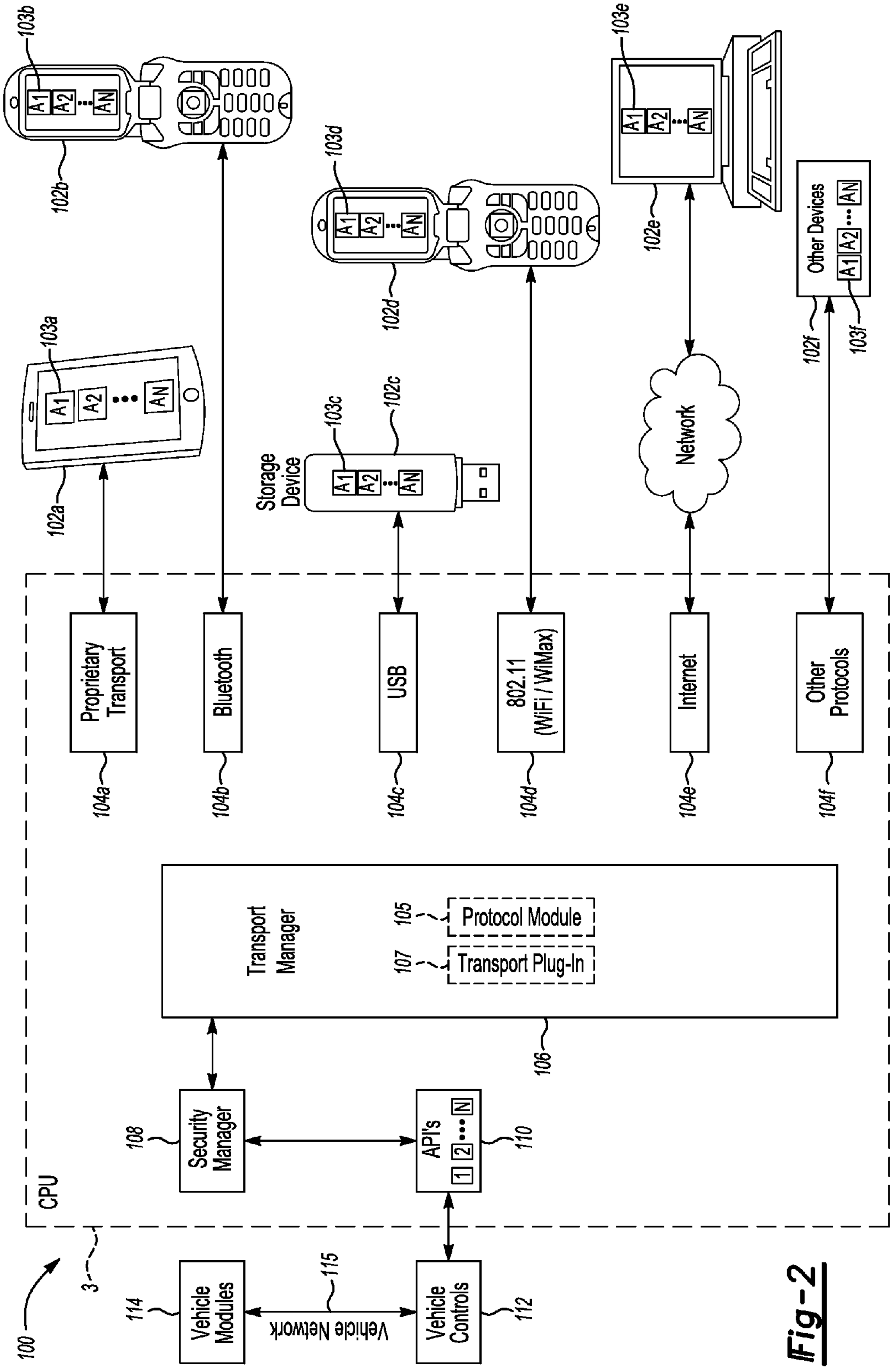
FIG. 2 is an illustrative system architecture exemplifying the communication interface between one or more remote terminals and the vehicle computing system of FIG. 1.

FIG. 2 illustrates a non-limiting framework in which a user may interface multiple devices with a vehicle computing system (VCS) 1. More specifically, the system 100 may permit a user to interface the applications 103*a-f* installed on the devices 102*a-f* with the VCS 1 for operating the applications 103*a-f* through the VCS 1. Operating the applications 103*a-f* may include, but is not limited to, activating the applications 103*a-f*, inputting commands and instructions (via voice, button presses, etc.), and receiving outputs (e.g., visual, graphical, textual, audible, and other like outputs).

It will be appreciated, however, that the architecture of FIG. 2 and associated description is non-limiting. For example, and without limitation, operation of the applications 103*a-f* may additionally or alternatively occur through the devices 102*a-f*. For example, and without limitation, the inputs, outputs, and commands may occur at the device 102*a-f*.

It will be further appreciated the various embodiments described with respect to FIG. 2 may be used additionally or alternatively for telematics support. As a non-limiting example, the various embodiments can be used when exchanging vehicle health report data. As another non-limiting example, the various embodiments can be used when exchanging licensing data for an application 103*a-f*. As another non-limiting example, the various embodiments may be used for remote door unlock.

Referring now to FIG. 2, there may be one or more devices 102*a-f* that may interface with the VCS 1. However, for purposes of illustration and clarity, FIG. 2 is shown with multiple devices 102*a-f*. Non-limiting examples of such devices may include cellular phones, handheld diagnostic tools, personal computers, smartphones, personal digital assistants (PDA), media devices (e.g., and without limitation Mp3 players), portable memory devices (e.g., and without limitation, USB thumbdrives, memory cards/sticks, SLOTMUSIC cards, and other suitable memory devices) and/or adapters for receiving these memory devices, and other devices that may be now, or hereafter, known.

The applications 103*a-f* installed on the devices 102*a-f* may be factory installed on the device 102*a-f* or installed by a user after purchase of the device 102*a-f*. For example, and without limitation, the user may install the application from a computer-readable medium (e.g., a CD or thumdrive) or download the application over the Internet (e.g., from a third-party site). A user may include, but is not limited to, a consumer, a vehicle dealership (and individuals employed by the dealership), or a service shop (and individuals employed by the serve shop). Non-limiting examples of applications 103*a-f* that may be installed to the devices 102*a-f* may include vehicle diagnostic applications, communication applications (e.g., and without limitation, electronic mail, VOIP, and text messages), entertainment applications (e.g., and without limitation, multi-media streaming, videos, music, games, etc.), social networking applications, location-based applications, personal advertisement-based applications, and others.

Each device 102*a-f* may communicate data through one or more communication channels using one or more communication protocols 104*a-f*. Non-limiting examples of such communication protocols 104*a-f* may include BLUETOOTH protocols, 802.11 protocols, TCP/IP, proprietary protocols (such as, without limitation, APPLE CORPORATION's iAP protocol), mass storage protocols (e.g., USB protocols), USB-based networking protocols (e.g., and without limitation, USE-Serial or USB-RNDIS), and other protocols now, and hereafter, known. It will be appreciated that devices 102*a-f* may be capable of communicating data using multiple communication protocols (e.g., and without limitation, BLUETOOTH and 802.11). This relationship between the VCS 1 and the devices 102*a-f* may be referred to as a network. In some embodiments, the relationship between the devices 102*a-f* and the VCS 1 may create an “ad-hoc” network.

It will be appreciated that while the various embodiments are described with respect to communication with a computing system in an automobile, there may be other environments in which the network may be implemented. Non-limiting examples of such environments include a home, an office, a school, an airplane, a train, a bus, and other like environments.

Referring back to FIG. 2, with respect to BLUETOOTH-ready devices, each device may also include one or more BLUETOOTH profiles that define with which devices the BLUETOOTH-ready device may communicate. Profile may be standard profiles (such as A2DP, HFP, SDAP, and HSP) or customized profiles. As a non-limiting example, the BLUETOOTH capable device may include the SDAP profile to discover which services may be available on the VCS 1. In some embodiments, the discovery process may be based on an SDAP record having a universally unique identifier (UUID) registered for the SDAP profile.

Devices 102*a-f* may establish a connection with the VCS 1 using a communication channel described above. In one embodiment, the devices 102*a-f* may listen for a connection request from the VCS 1. In other embodiments, the VCS 1 may listen for connection requests from the devices 102*a-f*. When a connection is established, a data transport manager 106 (which may or may not be implemented to CPU 3 of the VCS 1 as software) may receive the messages/data communicated from the one or more applications 103*a-f* (via device 102*a-f*) and process the messages/data for further transmission.

In some embodiments, the devices 102*a-f* may be simultaneously connected to the VCS 1. In other embodiments, the device 102*a-f* may establish individual and separate (i.e., not simultaneous) connections.

In one embodiment, the transport manager 106 may transmit this data to the security manager 108. Accordingly, the transport manager 106 may facilitate the communication between the device 102*a-f* and the security manager 108. Further details of the security manager will be described below. In some embodiments, the transport manager may also communicate with a data manager (not shown) which may communicate the data to the security manager. The data manager may store system data available between applications in a database structure.

Non-limiting examples of the duties of the transport manager 106 may include abstracting (i.e., standardizing) the communication protocols 104*a-f* and passing the following non-limiting information: data, transportation state changes, discovered applications, and start requests. The transport manager 106 may accomplish these duties as the interface for connecting to a device 102*a-f* with a given name over a given communication channel 104*a-f*. More specifically, transport manager 106 may send and/or receive data over an existing session. A session may be a logical connection between an application 103*a-f* on device 102*a-f* and the VCS 1. The transport manager may also provide notifications to the protocol module 105 (e.g., and without limitation, a connection to device). In one embodiment, notifications may be identifying information defining an occurrence triggering the notification. Further, the transport manager 106 may maintain various connection mappings, including a mapping between connections and all active sessions over a given connection and a mapping between connections and corresponding communication channels 104*a-f*. A “connection” may be a connection between the transport layers of the devices 102*a-f* and the VCS 1. Thus, the transport manager 106 may wrap transport specific details from the communication channels 104*a-f* with the data transport protocol (described below). The transport manager 106 may also maintain information about the connected device 102*a-f* (e.g., the device name) and information about the communication channels 104*a-f* (e.g., the transport name). Accordingly, transport manager may facilitate the exchange of user instructions between the applications 103*a-f* and the VCS 1 over any one of the communication protocols 104*a-f* used to communicate data to/from the device 102*a-f*.

As described above, the transport manager may facilitate the discovery of applications 103*a-f* and/or devices 102*a-f*. As a non-limiting example, discovery may be accomplished using zero configuration networking. In some embodiments, however, discovery may be specific to each communication protocol 104*a-f* (e.g., and without limitation, using service discovery protocol (SDP) for BLUETOOTH devices).

In one embodiment, the data transport manager 106 may include a data transport plug-in 107 that is implemented on the CPU 3. The data transport plug-in 107 may determined and manage the connection for each communication protocol 104*a-f*. For example, and without limitation, a plug-in may exist for proprietary protocols, BLUETOOTH protocols, 802.11 protocols, and the like. In some embodiments, the plug-in 107 may be implemented as a dynamic link library (DLL). Accordingly, capabilities for current and new communication channels 104*a-f* may be provided. The plug-in 107 may be implemented by an OEM or by third-party developers (such as Wipro Technologies).

The data transport plug-in 107 may provide an interface for connecting to a device 102*a-f*. In one embodiment, the plug-in 107 may wait for the incoming connections from the device 102*a-f*. The connection established by the plug-in 107 may permit data to be sent and/or received over an existing connection (as defined above). The interface may be independent of the underlying communication transport protocol 104*a-f*. In some embodiments, the plug-in 107 may provide notify the transport manager 106 of occurrences (e.g., and without limitation, a connection) based on information it receives. In one embodiment, notifications may be identifying information defining the occurrence. In further embodiments, the plug-in 107 may buffer data received over a transport connection.

As described above, the transport manager 106 may send and/or receive data that is transmitted over an existing session (as defined above). In one embodiment, the messages may be received/sent by a protocol module 105 which may be in communication with the transport manager 106. The protocol module 105 may perform a number of tasks in facilitating a user's operation of the applications 103*a-f* from the VCS 1. Some non-limiting tasks include: (1) protocol module initialization/un-initialization, (2) starting/ending a session (defined above) over a given connection (defined above), (3) adding/removing new and existing services (defined below), and (4) sending/receiving data over an existing session (defined above). In one embodiment, the protocol module 105 may also provide notifications. These notifications may be triggered when a data packet is received by the protocol module 105 (e.g., from the transport manager 106).

The protocol module 105 may determine the type of service that is requested from the applications 103*a-f*. A service may be a heartbeat (HB), a remote procedure call (RPC), or a bulk service. Other non-limiting services may include media streaming, use of application-specific transport protocols (e.g., applications may have specific domain protocols), use of other protocols (such as HTTP, FTP, IRC, SOAP, and IMAP), and other suitable service types. More generally, a service may indicate the type of action an application 103*a-f* may be requesting. In one embodiment, each service type may be maintained in a queue at the protocol module 105 and transmitted according to a transmission pattern. In one non-limiting example, this transmission pattern may be a first-in-first-out (FIFO) transmission pattern.

Additionally or alternatively, the protocol module 105 may assign each service type a priority. Thus, a service type with a higher priority may be transmitted before a service type with a lower priority. As a non-limiting example, a heartbeat service may have the lowest priority, an RPC may have an intermediate priority, and a bulk transfer may have the highest priority. It will be appreciated that other priority schemes may be used without departing from the scope and spirit of the various embodiments.

In one embodiment, the protocol module 105 may alternatively or additionally periodically send and/or listen for heartbeat messages for each active session. When listening for heartbeat messages (e.g., from devices 102*a-f*), the protocol module 105 may listen for a heartbeat for a predetermined time period and/or for a predetermined number of times. If a heartbeat is not received, the protocol module 105 may close the session and may transmit a status notification to the application 103*a-f*. Furthermore, each heartbeat may span a predetermined time period (e.g., and without limitation, 5 seconds).

Figure 5A:
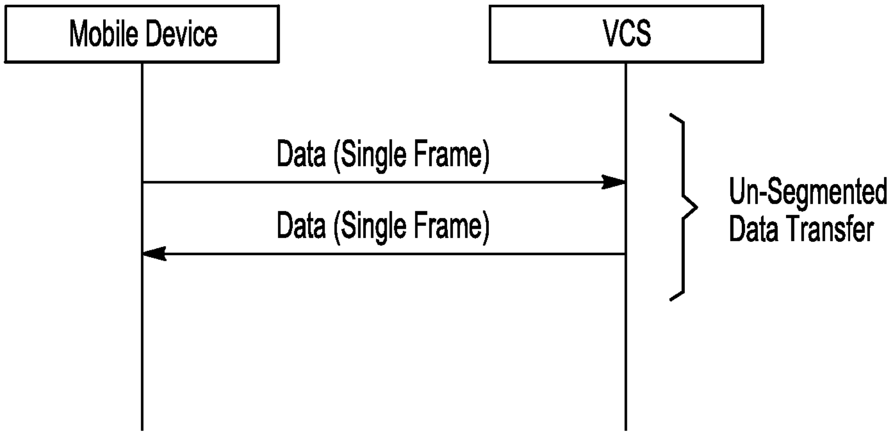
FIGS. 5*a* and 5*b* illustrate non-limiting examples of data exchange scenarios between the number of remote terminals and the vehicle computing system.
Figure 5B:
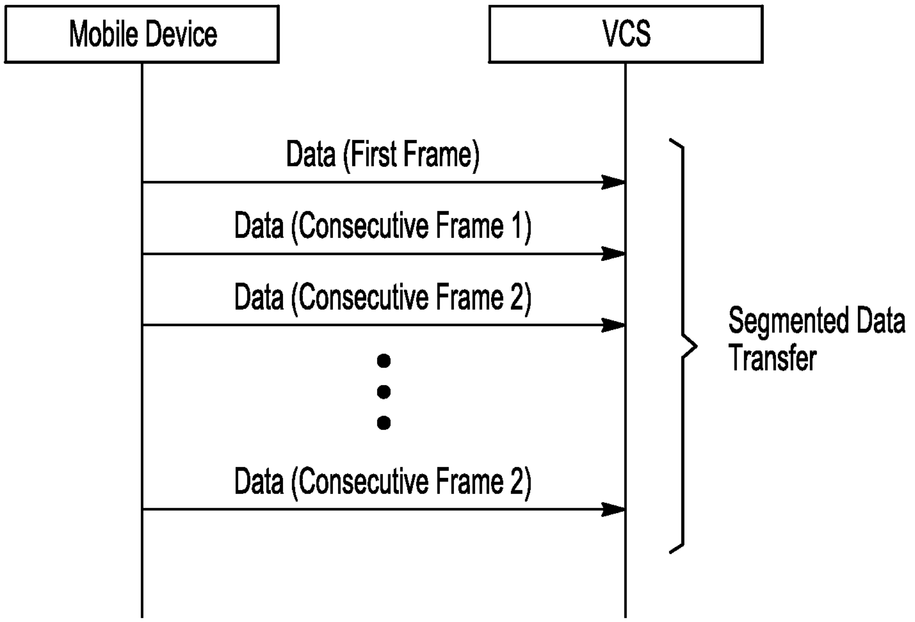

The protocol module 105 may also segment messages that exceed a particular payload threshold. The transport plug-in 107 may have a limit to the amount of payload it can receive. This may be referred to as a maximum transmission unit (MTU). Accordingly, the protocol 105 may segment the incoming message and transmit the messages in segmented form in order to comply with the transport plug-in's MTU rules. On return, the protocol module 105 may also re-assemble the segmented messages prior to transmitting a message to the application 103*a-f*. In one embodiment, the application 103*a-f* may only receive reassembled messages. Segmentation may also provide for increased performance of the system 100 by providing for interleaving of the data. In some embodiments, there may be a limit on the number of interleaved interactions. FIGS. 5A and 5B illustrate non-limiting examples of an un-segmented data exchange (FIG. 5A) and a segmented data exchange (FIG. 5B)

The protocol may be divided into two layers (e.g., a higher layer and a lower layer). A higher layer may contain the function calls required to accomplish device communication and system control flow. A lower layer may provide the basic communication functions. This lower layer may be agnostic of the hardware and system details.

Further details of the interaction between the various components of the system 100 will be described with respect to FIG. 3. As described above, the one or more messages (or data packets) received from the application 103*a-f* (as illustrated by arrow 200) may be transmitted according to a data transport protocol. This data transport protocol may be "transport agnostic." In this way, the data transport protocol may be a dynamic protocol such that it may support expandability without significant (or any) changes to its architecture. Thus, instructions (i.e., data) from the applications 103*a-f* may be transported via the data transport protocol regardless of which of the communications protocols 104*a-f* (i.e., both present and future communication protocols) the device 102*a-f* uses for transporting data.

For example, and without limitation, one device may operate application 103*a-f* using BLUETOOTH (e.g., using the Radio Frequency Communication (RFComm) and Logical Link Control and Adaptation (L2CAP) protocols) while another device may operate applications 103*a-f* using a propriety protocol (such as APPLE'S iAP). The data transport protocol facilitates operation of the applications on the respective devices 102*a-f* from VCS 1 without regard to the data communication channel 103*a-f* used by each device. From the perspective of a user, the application on a device 102*a-f* may be used seamlessly. From the perspective of a developer of the application 103*a-f*, the application does not need to be individually developed based on the differing communication protocols 104*a-f*.

Furthermore, the data transport protocol 200 may be bandwidth and latency neutral. Thus, in this embodiment, the protocol does not make assumptions regarding the speed of the data connection or latency delays from the applications 104*a-f*. In some embodiments, a lowest common denominator of the communication channels 104*a-f* may govern the interaction. The lowest common denominator may be relative. For example, BLUETOOTH is limited to approximately 700 kbs throughput compared with WiFi which can get approximately 10-20 mbs throughput.

In one embodiment, the data transport protocol may incorporate generic commands. In such an embodiment, specific functionality for interacting with the VCS 1 (such as commands specific to the VCS 1) may not be programmed to the protocol. Rather, general data transport abstractions may be provided between the VCS 1 and the application 103*a-f*.

Figure 3:
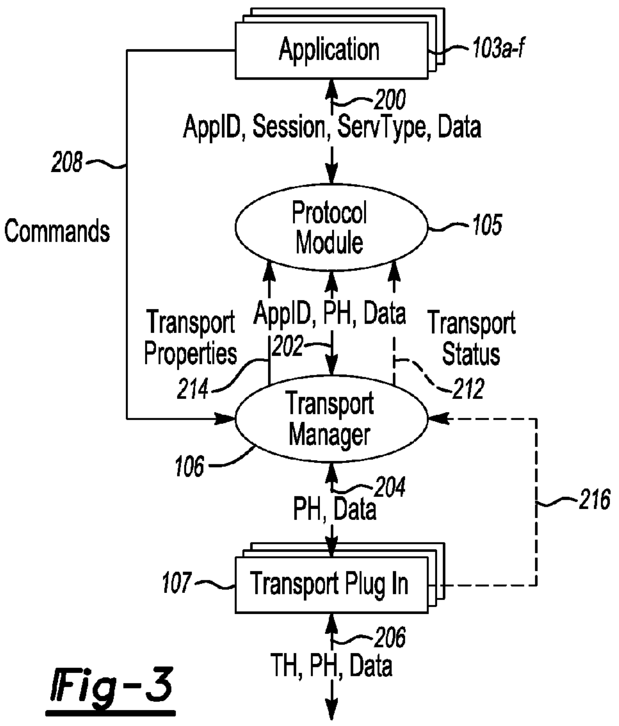
FIG. 3 illustrates a non-limiting example of a data flow for generating one or more data packets for exchange through the communication interface of FIG. 2.

As illustrated in FIG. 3, some aspects of the data exchange may be unidirectional (e.g., as represented by data flow arrow 208). Additionally or alternatively, some aspects may be bidirectional (e.g., as represented by data flow arrow 200). However, it will be appreciated that the disclosure and arrangement of FIG. 3 may be modified or re-arranged to best fit a particular implementation of the various embodiments of the invention.

An application identifier ("AppID"), session information ("Session"), a service type ("ServType") and application data may be transmitted from application 103*a-f* (arrow 200). Application data may include, but is not limited to, the user instructions/requests (e.g., and without limitation, correlation ID to tie a request to a response, commands to be executed, events to be fired, and status return codes) and application scripts (e.g., and without limitation, which may include the boundaries defining what resources of the VCS 1 the application 103*a-f* may use). The application data may also include icons, sound files, and graphics. From the vehicle, the application data may include, but is not limited to, sound captures and vehicle diagnostic captures. It should be understood that the make-up of the application data is open ended and non-limiting such that it may be added to and otherwise modified.

The AppID may be a unique ID that is associated with an application 103*a-f*. In some embodiments, it may be a numeric ID, a user-friendly description, an icon, and the like. The AppID may define that the applications 103*a-f* are operable with the VCS 1. Furthermore, once a session is established, the AppID may be used to identify the applications 103*a-f* to the user in the vehicle (e.g., at display 4).

Some of this data may be included in the data transport protocol. For example, and without limitation, the service type (e.g., and without limitation, RPC or bulk) may comprise at least one byte of the data protocol.

Additionally, a session ID (identifying the session) may comprise one or more bytes of the data protocol. The data from the applications 103*a-f* may be transmitted upon activation or during operation of the applications 103*a-f*. Table 1 below provides definitions for this data.

Additional content of the data transport protocol may include a frame type (e.g., and without limitation, a control frame, single frame, first frame, or consecutive frame), frame data (which may be based on the frame type), a version number of the protocol, a compression flag (i.e., the presence of compressed data), an algorithm used for compression, and the data size (which may be based on the frame type). This data may each comprise one or more bytes of the data transport protocol.

As further illustrated in FIG. 3, other data may be exchanged between the applications 103*a-f* and the transport plug-in 107. Various commands may be transmitted from the applications 103*a-f* to the transport manager 106. Non-limiting examples of some of these commands are provided in Table 1. The AppID (which may or may not be contained within a separate data packet), a protocol header for the data transport protocol, and application data (e.g., user instructions/requests, application scripts, etc.) may also be transmitted to the transport manager 106 (data flow arrow 202). The same information may be returned (e.g., when the operation has been performed at the VCS1) to the data transport protocol module 105 (data flow arrow 202).

The transport manager may also submit to the protocol module 105 transport properties (data flow arrow 214). Optionally, a transport status may be received from the transport plug-in 107 (data flow arrow 216) and transmitted to the protocol module (data flow arrow 212). The transport properties and transport status are described in Table 1. The transport manager 106 may also transmit to and receive from the transport plug-in 107 the protocol header (PH) and application data (data flow arrow 204). The transport plug-in 107 may generate a transport header (TH) and transmit it with the PH and the application data (data flow arrow 206). In one embodiment, the TH may be an optional header that holds surplus data which the data transport protocol cannot hold. Data may be considered surplus based on data size requirements dictated by the underlying communication protocol 104*a-f*. This data may be transmitted to the security manager 108.

TABLE 1

| Data/Control Information | Definition/Description |
|---|---|
| AppID | Application ID: Parameter that uniquely identifier an application in a given device |
| Session ID | An ID to identify a logical connection between applications on the devices 102a-f and the VCS 1 |
| ServType | Service Type: E.g., and without limitation, remote procedure call (RPC), bulk, media streaming, use of application-specific transports, use of other transports (such as HTTP), and other suitable service types. |
| Transport Properties | Information regarding the transport plug-in (e.g., and without limitation, transport plug-in name) |
| Transport Status | Includes information on the status of the transport (e.g., and without limitation, initialized/uninitialized, connected/disconnected, and error |
| Commands | Data transport commands including, but not limited to, initialize/uninitialized, connect/disconnect, and send message |

TABLE 1-continued

| Data/Control Information | Definition/Description |
|---|---|
| PH | Data Transport Protocol Header |
| TH | Transportation Header: header information added by the transport plug-in |

Referring back to FIG. 2, the security manager 108 may receive data from the transport manager 106 to ensure that application-specific policies and/or default security policies are being enforced. In this way, applications 103*a-f* may not obtain greater access to the resources of VCS 1 than is required by the applications 103*a-f*. Further, based on the security policies of the security manager 108, each application may be confined to operate within its "allowance" parameters. In one embodiment, the security policy enforcement may be viewed as a "sandbox" environment.

By way of example, if a user requests to operate a music program (e.g., PANDORA) from a device 102*a-f*, the security manager 108 may determine the use constraints (i.e., boundaries) with respect to VCS resources of the music program based on the computer-readable instructions (e.g., application scripts) from the application 103*a-f*. More specifically, the constraints may state that the music program may have access to graphics and audio, but not vehicle diagnostics. Accordingly, the constraints may be based on the particular function of the application.

Accordingly, the security manager 108 may determine which resources are being requested by an application 103*a-f* and block out access to other resources. Further, it may assess the policies defined for each incoming request from an application 103*a-f* to further restrict its access for the resource to which it has access.

In one embodiment, access to the VCS 1 resources (e.g., vehicle controls 112 and vehicle modules 114) may be accomplished through application programming interfaces (APIs) 110 installed on the VCS 1. These APIs may be developed by the vehicle OEM. In one embodiment, the API's may be programmed as DLL's and programmed in the C or C++ programming languages. Furthermore, each API may include its own set of security parameters so that each can enforce unique policy restrictions.

Non-limiting examples of vehicle controls 112 may include text-to-speech (TTS) functionality, speech-to-text (STT) functionality, voice controls, button controls (e.g., steering wheel button controls and/or center stack button controls), and touchscreen button controls. Operation on one or more vehicle modules 114 may be accomplished in response to the use of the one or more vehicle controls 112. Data may be transmitted between the vehicle controls 112 and the vehicle modules 114 over communication link 115. In one embodiment, communication link may be a vehicle network 115. Non-limiting examples of vehicle modules 114 include powertrain control modules (PCM), body control modules (BCM), ABS control modules, and the like. In additional or alternative embodiments, data may be transmitted to other vehicle modules 114 for audible, textual, and/or graphical output. These may include, but are not limited to, one or more displays (including, but not limited to, display 4, cluster screen displays (not shown) or rear entertainment displays (not shown)), speakers 13, or other like output modules in vehicle 31.

The APIs may be OEM developed APIs, third-party developed APIs and/or open APIs. As is known in the art, open APIs are APIs that permit interconnectivity between websites (e.g., social networking websites). Non-limiting examples of APIs and their non-limiting functions that may be installed on the VCS 1 are listed in Table 2 below.

TABLE 2

| API | Description/Function |
|---|---|
| Vehicle Interaction | Interaction through vehicle network interface layer; Interaction with the vehicle network (e.g., CAN); Diagnostic systems; GPS; Clock; Personalization. |
| Display | Menu interaction; Graphical widget interaction; Interaction with buttons; Access to display properties. |
| Audio | Interaction with Text-To-Speech (TTS) Engine; Interaction with voice recognition module; Access to microphone audio stream; Digital audio playback; Push audio files for playback. |
| VCS System Management | Event registration and notification facilities; Internal database access to transient and persistent data (e.g., media and phone databases); Access to system state and application state information. |
| System Administration | Extensions for providing functionality to various features of the VCS; Language selection and internationalization; System configuration parameters; Access to flash and external file systems. |
| Networking | Default socket access; Networking access; Events related to network availability |

Figure 4:
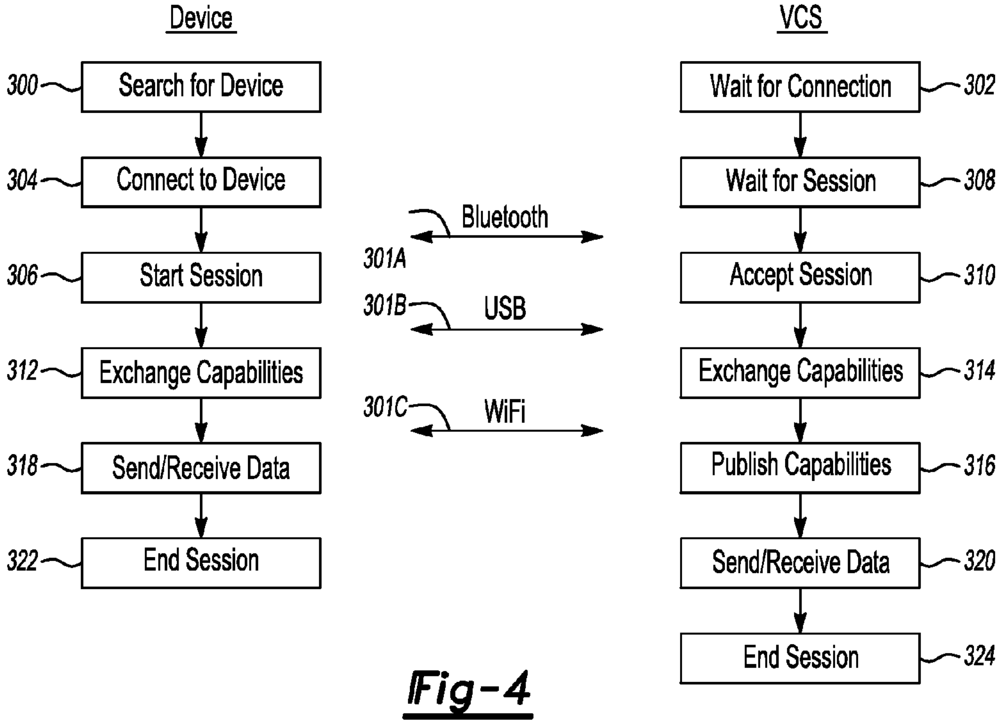
FIG. 4 illustrates an exemplary operation for establishing a connection between one or more remote terminals and the vehicle computing system.

FIG. 4 is a block diagram illustrating the interaction between the devices 102*a-f* and the VCS 1 so that the applications 103*a-f* may be operated from the VCS 1. The communication between the devices 102*a-f* and the VCS 1 may occur over any communication channels now, or hereafter, known. However, for illustration and clarity, FIG. 4 illustrates a device communicating over BLUETOOTH 301*a*, a device communicating via USB 301*b*, and a device communicating over WiFi 301*c*. Further, it should be understood that the communication may be between one or multiple devices.

As described above, in one embodiment, this interaction may occur in an ad-hoc network environment. The devices 103*a-f* may search for devices with which to connect (block 300). In this case, the device may the VCS 1. The search may be specific to the device's 102*a-f* communication channel 104*a-f*. For example, and without limitation, a BLUETOOTH device may search for the name of the VCS 1 (e.g., "SYNC") on the BLUETOOTH network. This may be performed at the pairing process. As another example, a WiFi enabled device may search for a predefined Internet Protocol (IP) address. The device 102*a-f* may transmit a connection request (block 304) to the VCS 1. VCS 1 may wait for the connection request from the device 102*a-f* (block 302).

Alternatively, the VCS 1 may search for devices 102*a-f* to generate a connection. In this embodiment, the devices 102*a-f* may listen for a connection request from the VCS 1.

Data may be exchanged over the established connection. The channel over which the connection request is transmitted may depend on the communication channel 104*a-f* utilized by the device 102*a-f*. As a non-limiting example, a BLUETOOTH device may publish a SDP record for a SPP channel over to which to communicate data. As another non-limiting example, a WiFi device may transmit the connection request (block 304) to a specific port from which the VCS 1 may listen for the incoming connection request and, once connected, over which the data may be communicated.

After a connection is made, a session (i.e., application level connection) may commence at the device 102*a-f* (block 306). The VCS 1 may wait for the session request (block 308) and accept the session (block 310). A session may then be generated. Furthermore, the VCS 1 may begin a new service type for interacting with the application over the session. In one embodiment, multiple sessions may be multiplexed over the same device level connection.

As illustrated in blocks 312 and 314, respectively, the application 103*a-f* and the VCS 1 may exchange capabilities. These capabilities may define the resources that the VCS 1 may permit the application 103*a-f* to use. From the application perspective, the capabilities may define the general capabilities of the application 103*a-f*. As a non-limiting example, the capabilities that may be exchanged from the VCS 1 may include language support, display type, and GPS support. Other non-limiting examples may include capabilities for certain functionality and a version level of the VCS 1. Non-limiting examples of capabilities that may be exchanged by the application 103*a-f* may include the capability to support GPS, vehicle data, and media applications. Application capabilities may also include the VCS 1 version that it supports. In one embodiment, the VCS 1 may also publish its capabilities to other device 102*a-f* that may be in the network (block 316).

The device 102*a-f* and the VCS 1 may send and receive data (block 318 and block 320). The data may be exchanged between the device 102*a-f* and the VCS 1 as RPCs or bulk data. It should be understood that manner of data exchange is an example and other methods of data exchange may be utilized without departing from the spirit and scope of the various embodiments.

As illustrated in blocks 322 and 324, respectively, the device 102*a-f* and the VCS 1 may complete or terminate a session. The session(s) may terminate at any time during the data exchange process.

Figure 6:
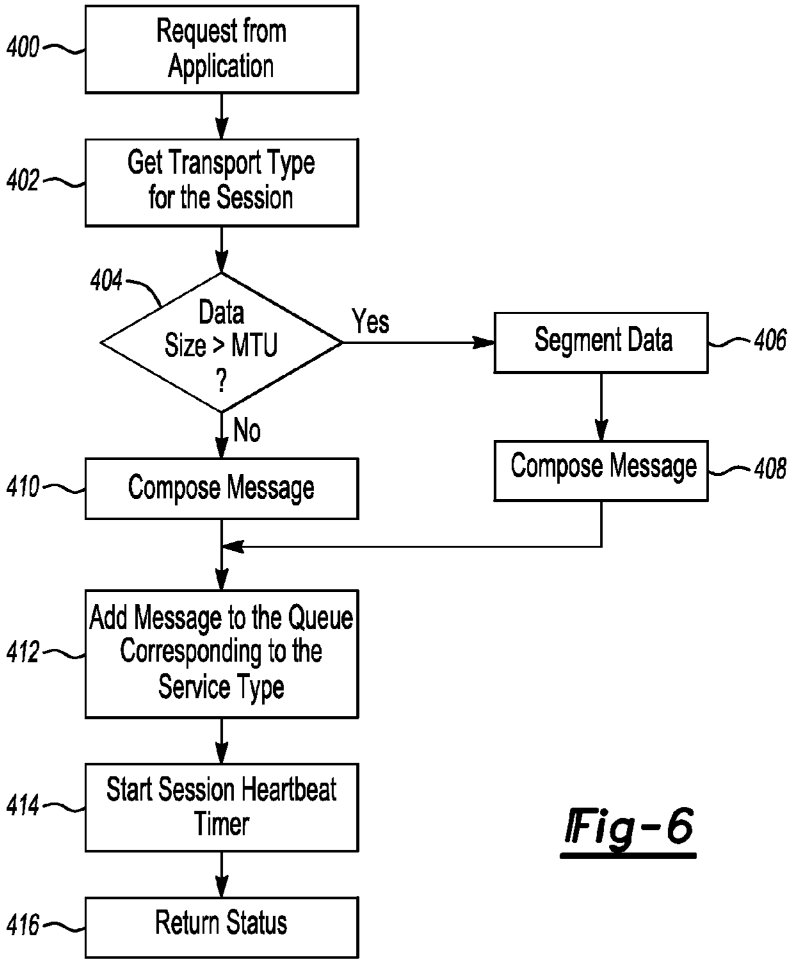
FIG. 6 illustrates one aspect of the operation for generating a message for transmission.

FIG. 6 illustrates an operation for generating and transmitting a data packet for transport using the data transport protocol after a connection and session has been established. At block 400, the application 103*a-f* may transmit a request to operate the application. The request may be received at the VCS 1. Furthermore, the communication channel 104*a-f* over which the session has been established may be received (block 402). As illustrated in block 404, a determination may be made whether the payload is greater than the MTU. If so, the data may be segmented (block 406) and the segmented data message composed (block 408). If not, an unsegmented data message may be composed (block 410).

In block 412, the message may be added to a queue corresponding to the service type identified from the message transmitted from the application 103*a-f*. In one embodiment, a session heartbeat timer may be triggered or activated to test that an active session is present (block 414). As illustrated in block 416, the status of the session based on the heartbeat may be returned.

Figure 7:
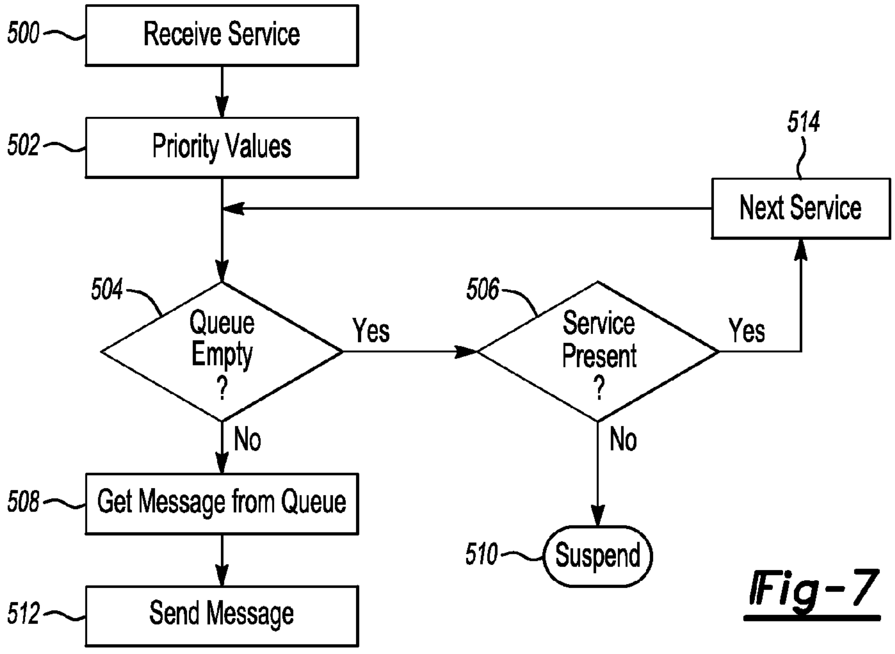
FIG. 7 illustrates the operation for message transmission and exchange between the remote terminals and the vehicle computing system.

FIG. 7 illustrates a non-limiting operation of the priority schema used by the data transport protocol to determine which service type is given priority. At block 500 the service (or task) to be performed is received based on user instructions from the device 102*a-f*. The service may be received based on the message/instructions from the application 103*a*-*f*. The priority value(s) may be defined in the data transport protocol (block 502). The priorities may be pre-programmed to the data transport protocol. For example, the priority values may define which service is given maximum priority, intermediate priority, and lowest priority.

As other non-limiting example, the priority value may only define a single priority value or a group of the possible priority values (e.g., which service is given maximum priority and which service is given lowest priority).

As illustrated in block 504, a determination may be made whether a queue exists for any of the services. Each service may have its own queue. In other embodiments, the different services may be arranged together in a queue (e.g., RPC and bulk service may be in one queue). If the queue is empty, a further determination may be made whether any services are present (block 506). If so, the service having the next priority is examined to determine the status of its queue (block 514). The status of the service queue may be determined (block 504). If another service does not exist, the process may be suspended (block 510).

If a service is included in the queue, the message from the queue may be retrieved (block 508). In one embodiment, the retrieval may be on a FIFO basis. Once the message is retrieved, the message may be sent (block 512). As a non-limiting example of this priority scheme, several HB and/or RPC message may be sent while a bulk transport file is running.

While exemplary embodiments are illustrated and described above, it is not intended that these embodiments illustrate and describe all possibilities. Rather, the words used in the specification are words of description rather than limitation, and it is understood that various changes may be made without departing from the spirit and scope of the invention.

What is claimed:

1. A method comprising:

receiving multiple application requests, from multiple devices using different communication protocols, to connect with a vehicle computing system (VCS);

determining the devices' communication protocols;

imposing a general transport protocol, transport agnostic of each device's native communication protocol, on the multiple devices' communication protocols, for application request-related communication between the devices and the VCS; and communicating data payloads based on the general transport protocol, over different channels corresponding to different communication protocols.

2. The method of claim 1, wherein the communication protocols are selected from the group consisting of Internet protocols, BLUETOOTH protocols, proprietary protocols, 802.11 protocols, and mass storage device protocols.

3. The method of claim 1 wherein the data payloads include instructions to operate one or more application programs installed on the two or more devices.

4. A system comprising:

a vehicle computer configured to:

facilitate application request-related communication between the computer and multiple devices using different communication protocols;

determine the devices' communication protocols;

impose a general data transport protocol, transport agnostic of each device's native communication protocols, on the multiple device's communication protocols, for application request-related communication between the devices and the computer; and communicate data payloads based on the general transport protocol, over different channels corresponding to different communication protocols.

5. The system of claim 4 wherein the data processor is a vehicle computer.

6. A non-transitory computer program product embodied in a computer readable medium for interfacing two or more devices and a vehicle computing system (VCS), the computer program product comprising instructions for:

establishing a connection with multiple devices, using different communication protocols for data communication;

determining the multiple devices' communication protocols;

imposing a general transport protocol, transport agnostic of each device's native communication protocol, on the multiple devices' communication protocols, for application request-related communication between the devices and the VCS; and communicating data payloads based on the general transport protocol, over different channels corresponding to different communication protocols.

7. The computer program product of claim 6 wherein the connection is a simultaneous connection.

* * * * *